United States Patent [19]
Whitney et al.

[11] Patent Number: 4,486,046
[45] Date of Patent: Dec. 4, 1984

[54] UNDERCARRIAGE AIRSTREAM DEFLECTOR ASSEMBLY FOR TRUCK TRAILERS AND THE LIKE

[76] Inventors: Michael L. Whitney, 26918-210th SE., Kent, Wash. 98031; William G. Blakley, 1810 S. 134th St.; Larry W. Blakley, 11729-14th Ave. S., both of Seattle, Wash. 98168

[21] Appl. No.: 431,691

[22] Filed: Sep. 29, 1982

[51] Int. Cl.³ .............................................. B62D 35/02
[52] U.S. Cl. .............................. 296/1 S; 280/154.5 R
[58] Field of Search .......................... 296/1 S, 91, 181; 105/2 R; 180/84; 280/154.5 R

[56] References Cited

U.S. PATENT DOCUMENTS

| | | | |
|---|---|---|---|
| 3,743,343 | 7/1973 | Grote, Sr. et al. | 296/1 S |
| 4,119,339 | 10/1978 | Heimburger | 296/1 S |
| 4,262,953 | 4/1981 | McErlane | 296/1 S |
| 4,421,354 | 12/1983 | LeMaster | 296/1 S |

FOREIGN PATENT DOCUMENTS

| | | | |
|---|---|---|---|
| 1903789 | 2/1978 | Fed. Rep. of Germany | 280/154.5 R |
| 2051691 | 1/1981 | United Kingdom | 296/1 S |

*Primary Examiner*—David A. Scherbel
*Assistant Examiner*—Dennis H. Pedder
*Attorney, Agent, or Firm*—Graybeal & Cullom

[57] ABSTRACT

Airstream deflector assembly (D) on the underside (16) of a large vehicle such as a semi-trailer (T) or the like, to reduce drag, improve fuel economy, and reduce turbulence of rain or snow on a roadway (R) traveled by the vehicle, such assembly comprising a main panel (30) which is essentially flat and situated well forward of the following tires (14) of the vehicle and deflecting the airstream downwardly primarily below the following axle (15) and centers of such following tires (14), such main deflection panel (D) having mounted thereon four lateral airstream deflectors, two (80) outboardly and two (90) inboardly of the panel (30) which serve to concentrate the deflected airstream laterally toward the following tires (14) of the vehicle and away from the "tunnel" between the tires (14). Both the main deflection panel (30) and lateral deflectors (80, 90) are preferably angularly adjustable, either manually or remotely, with the preferred angularity of the main panel being with it lying in a plane which intersects the following tires (14) slightly below their axis of rotation, e.g. at an angle of 10°–15°, and with the preferred angularity of the lateral deflectors (80, 90) being with them lying in planes substantially intersecting the inner faces of the following tires of the vehicle, e.g. at angles of 4°–15° relative to the direction of movement of the vehicle.

14 Claims, 6 Drawing Figures

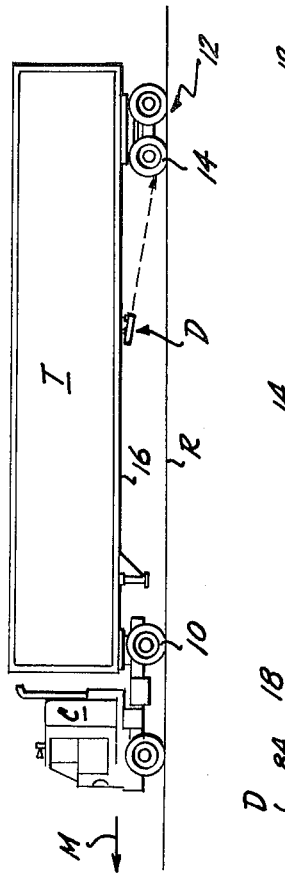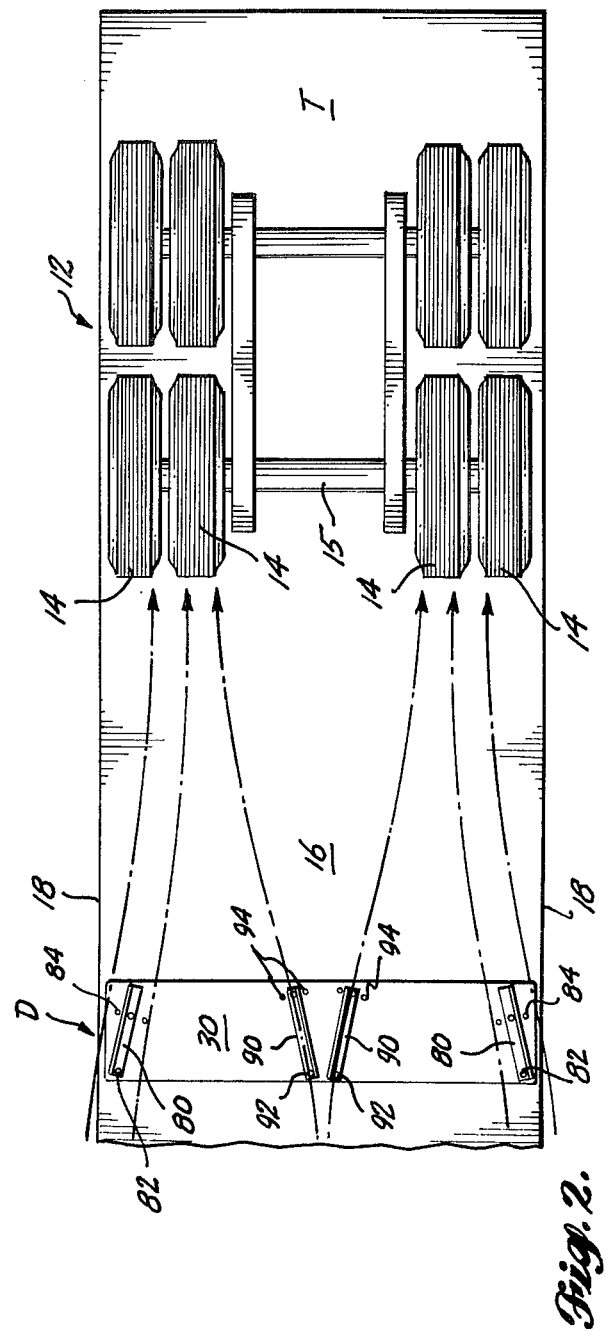

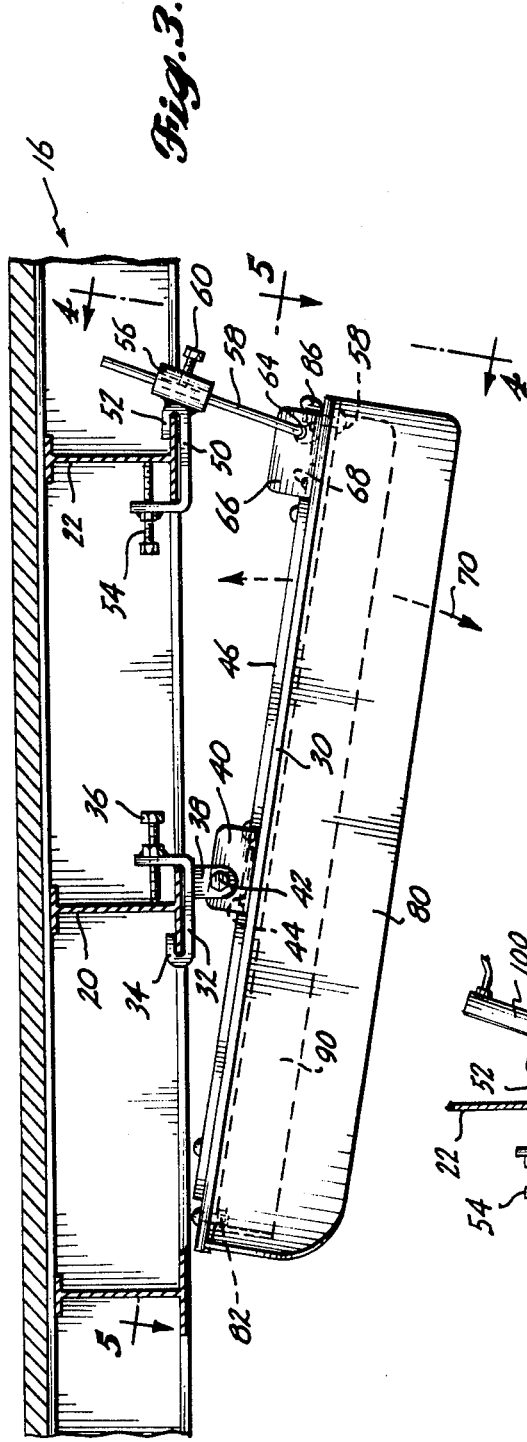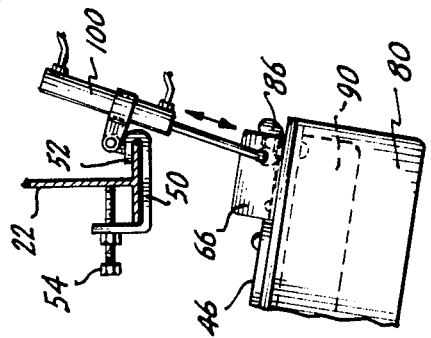

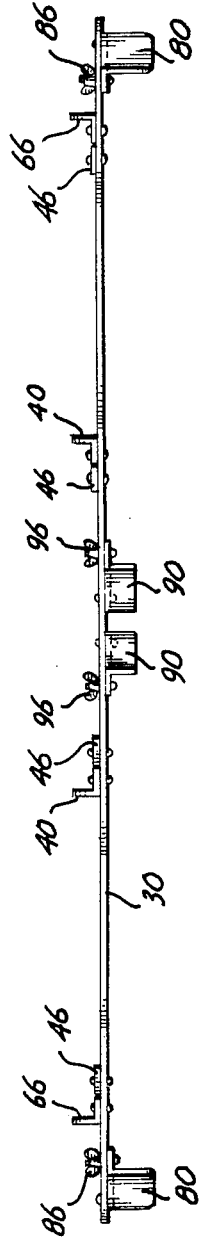
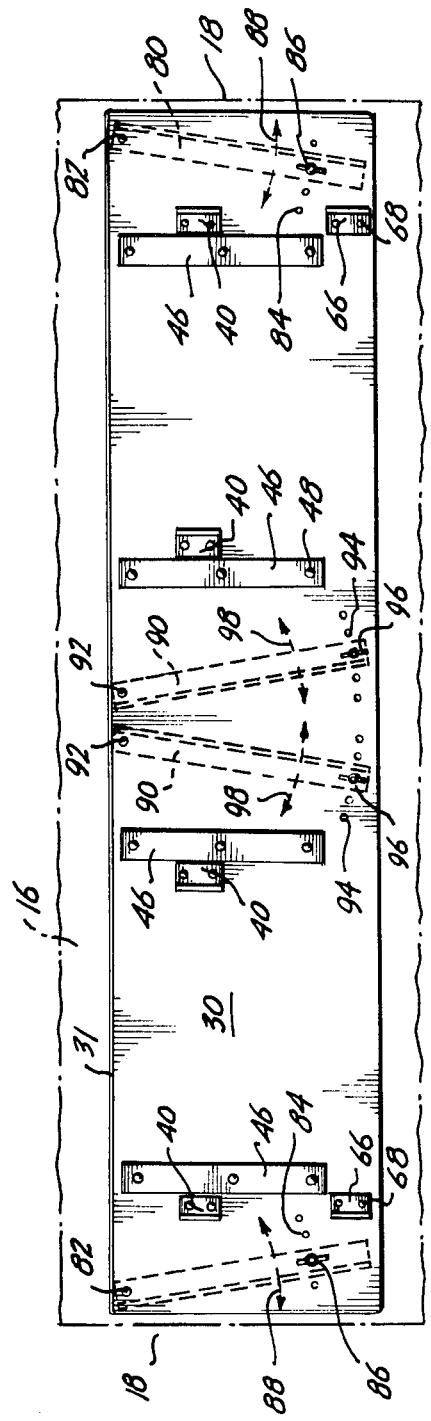

UNDERCARRIAGE AIRSTREAM DEFLECTOR ASSEMBLY FOR TRUCK TRAILERS AND THE LIKE

BACKGROUND OF THE INVENTION

1. Field of the Invention

The present invention relates to increased fuel efficiency and greater driving safety by deflecting and otherwise altering the airflow underneath the trailer of a truck trailer rig or the like.

2. Description of the Prior Art

It is well known that the fuel efficiency of any motor driven vehicle is directly related to the vehicle's aerodynamic structure and the amount of atmospheric turbulence caused by the movement of the vehicle. The greater the air turbulence created by the vehicle the greater the resistance, and the more fuel required to move the vehicle. In today's economy, fuel efficiency is of major concern and is particularly relevant when considered in terms of large tractor trailers used for transporting goods wherein the cost of fuel consumed moving the goods directly affects the market price of the goods.

As the trailer of a large tractor trailer is pulled forward by the tractor, a great deal of turbulence is created underneath the trailer as the vehicle disturbs the air. This turbulence results in the increased resistance to forward movement of the trailer and thus lower fuel efficiency.

Recognizing this problem, McErlane, U.S. Pat. No. 4,262,953 shows a deflector panel of compound convexity mounted just forward of the rear axle or axles of a tractor drawn trailer. The purpose of the McErlane deflector panel "is to direct as much air as possible downwardly and rearwardly for the airstream to pass between the innermost vehicle wheels to the region behind the rear of the vehicle." So directing the airstream is said to reduce "the negative pressure or vacuum in the region of the vehicle where differential pressure has the greatest net vehicle retarding effect, that is, at the rear of the vehicle."

Although fuel efficiency has become a primary concern in the recent decade because of fuel cost, a second major consideration is that of increasing the safety of operation of tractor trailer rigs, particularly from the point of view of safety of other motorists sharing the road with such rigs. A major disadvantage of tractor trailers on the highway is that, unaltered, the turbulent air flow beneath and behind a tractor trailer is generally in a direction transverse to that of the movement of the tractor trailer. This means that in wet or snowy conditions, mist and/or snow is thrown laterally of the trailer causing a vision and turbulence problem for any motorist passing or being passed by the rig. To combat these problems, Grout, Sr. et al, U.S. Pat. No. 3,743,343 discloses a baffle means to be mounted on the undercarriage of the trailer forward of its rear axle(s) which channels the airflow toward the rear and in the direction generally perpendicular to the rotational axes of the wheels, to mitigate the turbulence discharge from beneath the trailer in a direction generally transverse the trailer's movement. Besides the baffle means mounted on the sides forward of the rear axle the Grout patent also discloses a so-called "coagulating means" which is mounted to the undercarriage of the trailer rearwardly of the rear axle and which is designed to gather any turbulent discharge and direct it downwardly towards the road or pavement, thus attempting to minimize lateral discharge.

Also known are airstream deflectors for tractor trailer rigs which are mounted on the top of the tractor or on front of the trailer above the tractor, some of which are remotely controlled in deflection attitude by dual acting air cylinders.

SUMMARY OF THE INVENTION

It is a principal object of this invention to increase fuel efficiency of a motor vehicle such as a tractor trailer rig, by decreasing turbulence caused by its forward movement and thus reducing resistance to said forward movement. This is accomplished by redirecting the airstream passing underneath the vehicle to primarily impact the rear tire and wheel assemblies of the vehicle in the lower portion thereof.

A further principal object of this invention is to provide a device which increases traffic safety by decreasing the kickup of water spray, mud, snow, or other debris from beneath the wheels of a forwardly moving vehicle, particularly at the rear thereof.

Another objective of this invention is to provide means for cooling the rear tires and brakes of a trailer type vehicle as it travels down a roadway.

A further object of this invention is to provide a device which reduces the buildup of snow, ice and other deposits on the rear axle(s) and cross members, and on the rear end surfaces of a vehicle.

BRIEF DESCRIPTION OF THE DRAWINGS

FIG. 1 is a schematic side elevational view of a tractor trailer rig illustrating the preferred location and angle of attack of an airstream deflector assembly according to the present invention;

FIG. 2 is a schematic bottom elevational view of the rear portion of the trailer of the rig shown in FIG. 1, illustrating in an idealized manner the air stream flow created by the preferred angularity of the lateral deflectors;

FIG. 3 is a side elevational view, with parts cut away for clarity, illustrating the relationship between the inner and outer lateral deflectors and the mounting means by which the deflector assembly is secured to the undercarriage of the trailer;

FIG. 4 is a rear view of the main panel and lateral deflectors of the assembly of FIG. 1;

FIG. 5 is a cross-sectional view taken substantially along lines 5—5 of FIG. 3; and FIG. 6 is a detail, fragmentary view of a modified form of adjustment means for varying the deflection angle of the main deflector panel, permitting remote control thereof.

DISCLOSURE OF THE INVENTION

The present invention relates to an airstream deflector device which, when mounted to the undercarriage of a motor driven vehicle, improves the aerodynamics of the vehicle, thereby increasing its fuel efficiency and reducing the agitation and pickup of water spray and the like from the roadway traversed by the vehicle. The airstream deflector device of the present invention is adjustable and when optimally adjusted deflects the stream of air passing underneath the vehicle into the lower portion of the following tires and axle of the vehicle, thereby reducing the turbulence created by this stream of air and also cooling the rear wheel tires and brakes of the vehicle.

The airstream deflector comprises an essentially planar panel of sufficient length to substantially laterally span the undercarriage of the vehicle to which it is to be mounted, such as the trailer of a tractor trailer rig, well forward of the following tires of the trailer.

The forwardmost edge of the deflector panel is suitably positioned close to the undercarriage of the body of the vehicle, and secured thereto as by clamp means located forwardly of the middle of the upper side of the panel. Suitably, also, the trailing edge of the upper side of the panel is secured to the underside of the trailer by a second clamp means attached to the vehicle and comprising a slidable adjustment rod, which can be lengthened or shortened. By lengthening or shortening this adjustment rod, the angle of the deflector panel relative to horizontal can be varied. Preferably, the deflector panel is mounted approximately midway between the rear tires of the tractor and the following tires of the trailer of the vehicle, with the rearward edge thereof directed downwardly at an angle of about 10°–15° relative to horizontal.

The under or ground facing side of the panel has affixed to it two and preferably four adjustable air-stream deflectors, for deflecting the airstream laterally of the main panel. These lateral deflectors suitably have a right-angle cross section and are mounted to be pivotally movable parallel to the main panel in attitudes extending generally laterally of the panel. Two of the lateral deflectors are mounted near the outboard ends of the deflector panel. Preferably, also, two are mounted near the center of the panel.

The primary purpose of the air stream deflection by the main panel is to deflect the air stream into a path well below the underbody of the vehicle and primarily into the area generally below the following axle and centers of the following tires of the vehicle, i.e. substantially at and below the leading or forwardmost surfaces of the following tires.

The general purpose of the outboard lateral deflectors is to deflect the airstream into the area of the following tires and the primary purpose of the inboard lateral deflectors is to outwardly deflect the air stream toward the following tires and somewhat away from the "tunnel" between the following tires. Although the main deflection panel and the lateral deflectors are adjustable over substantial angles of deflection for large semi-trailers, it has been found that the angle of deflection of the panel should be about 10°–15° downwardly relative to the direction of movement of the trailer, i.e. relative to horizontal, that the angle of deflection of the outboard lateral deflectors should be about 4°–15° relative to the direction of movement of the trailer, and the angle of deflection of the inboard lateral deflector should also be about 4°–15° relative to the direction of movement of the trailer.

It is theorized that the downwardly deflected airstream, deflected by the main panel primarily into the area generally below the following axle and in a trajectory engaging the roadway at a quite shallow angle, and the lateral deflection of the airstream, which serves to pull in the airstream from the sides of the trailer and concentrate the airstream into contact with the downwardly moving and receding tread and side surfaces of the following tires, collectively provide what may be termed a "blanket" of relatively high velocity air on the roadway, with substantially reduced airstream contact with non-receding trailer surfaces such as the following axle(s) and the forwardly moving upper portions of the following tire treads and sides. Such reduced air contact with non-receding trailer surfaces reduces drag on the trailer, and the "blanket" of air on the roadway, primarily below axle level, tends to hold down water, mud or snow kickup from the roadway and to also keep the rear end of the trailer clearer of accumulated mud or snow because less kickup of mud or snow into the reduced pressure zone behind the end of the trailer occurs with the water, mud or snow on the roadway tending to stay at a near roadway level until the reduced pressure zone at the end of the trailer is past. Such deflection of the airstream into the following tires and wheels also acts to cool the tires and the brakes of the vehicle as it travels along the roadway.

DESCRIPTION OF THE PREFERRED EMBODIMENT

FIG. 1 schematically portrays a typical, large tractor-trailer rig comprising tractor C and trailer T, both conventional per se and 45 feet in length overall, with the trailer T of typical length, 60 feet being selected by way of example. As will be understood, the rear wheels 10 of the tractor C support the forward end of the trailer T and the rear thereof is supported by a following tandem axle and dual-wheel assembly, generally indicated at 12, including dual wheels and tires at each end of each axle, as best shown in FIG. 2, the leading tires 14 and leading axle 15 of the trailer, which are also termable the following tires and axle for purposes of description of the embodiment of the invention in that they immediately follow the tractor C rear tires 10 and follow the under trailer deflector assembly of the present invention as the rig moves over the roadway R in a direction of movement schematically indicated at M.

Said deflector assembly is generally indicated in FIGS. 1 and 2 at D. As shown in FIG. 2 and also in FIG. 5, the assembly comprises a nominally planar metal (e.g. ¼" aluminum alloy sheet) panel 30 which substantially laterally spans the underside 16 of the trailer T, extending essentially to but just short of the sides 18 thereof.

As shown in FIG. 1, the panel 30, which may otherwise be termed the main deflection panel, is mounted below the underside 16 of the trailer T, just rearwardly of the midpoint between the rear tires 10 of the tractor C and the following tires 14 of the trailer T. In the selected example, in which trailer T is some 45 feet long, the panel 10 is mounted so that its center is some 20 feet forwardly of the rear of the trailer T, and some nine feet six inches forwardly of the forwardmost surfaces of the following tires 14.

In the embodiment shown, the mounting of the panel 10 to the underside 16 of the trailer T is pivotal in nature, utilizing four laterally arranged J-clamps 32, each comprising a forwardly placed hook portion 34 and a lock bolt 36 engaging a selected cross I-beam 20 forming a part of the underside 16 of the trailer T (FIG. 3). Each of the J-clamps 32 further comprises a depending eye portion 38 to which is attached an eye plate 40, by means of a pivot bolt 42, each eye plate 40 being in turn attached by rivets 44 to the panel 30. As best shown in FIG. 5, strengthening plates 46 extend laterally of the panel 30 along the upper side thereof alongside the eye plates 40 and are attached to the panel by various rivets, certain of which are indicated at 48.

The panel 30 is adjustably positioned and maintained at a selected airstream deflection angle with respect to the underside 16 of the trailer T by means of a pair of adjustable clamp means situated near the ends of the panel 30 along the trailing edge thereof, each of which adjustable clamp means comprises a J-clamp generally indicated at 50 having a curved end 52 and a lock bolt 54 engaging a following cross I-beam 22 of the underside 16 of the trailer T. Each such clamp means further comprises a cylindrical sleeve 56 receiving a rod 58 and retaining the rod 58 in a given position of adjustment by means of lock bolt 60, the lower end of the rod 58 comprising a right angle bend 62 (FIG. 5) engaged in a hole 64 in an eye plate 66 which is in turn attached to the panel 30 by rivets 68. As will be apparent, the adjustment and maintenance of the panel 30 at a desired deflection angle, about the pivot points provided by bolts 42, as schematically indicated at 70 (FIG. 3), is by means of release of lock bolts 60, movement of the rods 58 in the sleeves 56 to desired position, and locking of the rods 58 in the sleeves 56 by tightening of the bolts 60.

For simplicity and clarity of illustration, the underside 16 of the trailer T is shown simply schematically in FIG. 2, without particular showing of conventional detail thereof such as the cross I-beams 20, 22, and such as other conventional detail like air brake hose systems, spare tire and tire mounts, and the like.

Arranged along the under or ground facing side of the panel 30 are adjustable lateral airstream deflectors, four of which are employed in the preferred example, each of substantially L-shaped cross section and pivotally mounted to be adjustable parallel to the lower face of the panel 30. The purpose of these lateral deflectors is to laterally deflect the panel deflected airstream to concentrate its engagement with the following tires and to reduce the airflow both in the "tunnel" between the tires and outboardly of the tires, which airflow otherwise cause much of the drag on the vehicle and much of the disturbance of water, snow or the like on the roadway. Specifically, two lateral airstream deflectors 80 are located at substantially the ends of the panel 30 and two lateral airstream deflectors 90 are located close to each other and substantially centrally of the panel 30. As best shown in FIGS. 3 and 5, lateral deflectors 80 are pivotally mounted near the end of the panel 30 just behind the leading edge 31 thereof by means of pivot bolts 82 and lateral deflectors 90 are similarly pivotally mounted near-center of the panel just behind the leading edge 31 thereof by means of pivot bolts 92. Setting of the lateral deflectors at desired deflection angles is by means of respective series of adjustment holes 84 and 94 in the panel 30, into a selected one of which respective bolt and wing nut assemblies 86 and 96 pass through trailing holes in the respective deflectors 80, 90, and a selected hole in the respective series of holes 84, 94. By such arrangement, each of the lateral deflectors 80 is angularly adjustable laterally of the panel 30, as schematically indicated at 88, and each of the inboard lateral deflectors 90 is likewise laterally adjustable, as schematically indicated at 98.

It has been found preferable to provide in the outboard lateral deflectors 80 a deflection surface area at least about twice that of the deflection surface areas of the inboard lateral deflectors 90. The larger area of the outboard lateral deflectors 80 serves to create a substantial low pressure zone immediately forwardly and outboardly of the following tires and to draw air into the tires which otherwise would flow along the lower portions of sides 18 of the trailer or would pass just outboardly of the following tires. It has been found that much of the turbulence agitating kickup of debris from the roadway occurs by reason of the flow of air along the lower portions of the sides 18 and outboardly of the following tires of the trailer, and for this reason the use of outboard lateral deflectors 80 in combination with the main panel 30 is essential to effective turbulence and drag reduction according to the present invention. In this respect, however, the inboard lateral deflectors 90, although improving the desired action of the deflector assembly to a substantial extent, are optional and may be dispensed with, if desired.

Operational testing of a prototype deflector assembly as shown at FIGS. 1–5 on a rig made up of a 1982 Peterbilt Model 362 cabover tractor with a 1981 45 foot Great Dane tandem axle dual wheel trailer, and with the panel assembly eleven feet forward of the axle of the following wheels and the main deflector panel set at a downward angle of $10\frac{1}{2}°$ relative to horizontal with the outboard lateral deflectors set at an angle of 4° and the inboard lateral deflectors set at an angle of $10\frac{1}{2}°$ relative to the direction of movement of the trailer, has established that fuel savings of 10–18% are attainable by use of the deflector assembly of the present invention, as compared with comparable operation of the same rig without the deflector assembly. In addition, the deflector assembly accomplished a marked reduction in roadway water or snow disturbance when in use on the rig.

Considering that the indicated Great Dane semitrailer has a standard semi-trailer width of eight feet (96 inches), the deflector assembly panel 30 shown in FIG. 2, will be understood to be about 92 inches in length and about 24 inches in width, with each of the outboard lateral deflectors 80 being about 24 inches in length and about 4 inches in width, providing a deflection area of about 96 square inches. Likewise, each of the inboard lateral deflectors is about 23 inches in length and about 2 inches in width, providing a deflection area of about 46 square inches.

The manually settable deflection angle adjustment means including sleeve 56 and rods 58 for setting of the deflection angle of the panel 30 may be replaced by a remote control arrangement involving a pair of dual acting air cylinders 100, one of which is shown at FIG. 6. As will be recognized, with compressed air already conventionally available on the trailer T in the wheel assemblies 12, for air brake purposes, a given desired deflection angle position for the panel 30 may be accomplished, for example, by selective control of air delivery to air cylinder 100, under control of electrically controlled air valve means (not shown), actuated by electric switch means available to the driver in tractor C, in a manner known per se.

As will be readily understood by those skilled in the art to which the invention is addressed, other structural variations in assembly construction are readily available. Thus, simply by way of further examples, the deflectors can be fabricated of glass fiber reinforced plastic or other material, rather than of metal, and the series of holes 84, 94 can be simply curved slots. Also, although the preferred embodiment illustrated and specifically discussed is of a type designed for add-on installation and for ready installation and removal from the underside of a variety of vehicles, such can readily be designed for permanent installation either as original equipment or otherwise, and need not necessarily be adjustable in deflection angles, particularly as original equipment on a trailer or the like of a given configuration. Other variations, adaptations and modifications of the construction and arrangement of the assembly according to the present invention will occur and are to be considered within the scope of the invention as defined by the following claims.

What is claimed is:

1. An airstream deflector assembly comprising an essentially flat airstream deflector panel having an upper side facing and substantially spanning the undercarriage of a wheeled vehicle and having affixed thereto means for attaching said panel to said undercarriage, the lower side of said panel facing the ground and directing the airstream downwardly and primarily below the following axle and centers of the following tires of the vehicle, the panel having affixed thereto a plurality of airstream deflectors concentrating the airstream laterally toward the following tires of the vehicle.

2. The assembly of claim 1, comprising a plurality of attachment means affixed to the upper side of the panel forwardly thereon, for attaching the structure of the undercarriage of the vehicle, and a plurality of attachment means affixed rearwardly of said panel and comprising adjustment means for selectively setting and changing the airstream deflection angle of the panel.

3. The assembly of claim 2, wherein said airstream deflector means is mounted slightly rearwardly of the mid point between the rear tires of a truck tractor and the following tires of a truck trailer, with the leading edge of the deflection panel fitted closely to the undercarriage of the trailer.

4. The assembly of claim 1, wherein the plurality of airstream lateral deflectors includes two deflectors positioned near the ends of the deflector panel and deflecting the airstream substantially inboardly toward the following tires.

5. The assembly of claim 2 or claim 3 or claim 4, wherein the deflection panel occupies a plane which intersects the following tires of the trailer slightly below their axis of rotation.

6. The assembly of claim 1, wherein four lateral airstream deflectors are affixed to the underside of said deflector panel, and comprise four deflectors each of substantially L-shaped cross section, pivotally mounted to be adjustable parallel to the lower face of said panel, the forwardmost ends thereof being pivotally affixed at substantially the leading edge of said panel, and the rearwardmost ends thereof being adjustably mounted so that the deflection angle of each laterally of the deflector panel is adjustable through a substantial range.

7. The assembly of claim 6, wherein two lateral airstream deflectors are located at substantially the ends of said panel and two are affixed to said panel close to each other and substantially centrally of said panel, the two such end placed lateral deflectors being positioned to deflect the airstream substantially inboardly thereof, and the two such centrally placed lateral deflectors being positioned to deflect the airstream substantially outboardly thereof.

8. The assembly of claim 7, wherein said lateral deflectors are positioned to deflect portions of the airstream passing beneath the undercarriage of the forwardly moving vehicle and the deflector panel into streams directed substantially at and below the leading surfaces of the vehicle's tires rearwardly thereof.

9. The assembly of claim 1, wherein said deflector panel is made of sheet metal.

10. The assembly of claim 1 or claim 6, wherein said deflector panel is positioned to have a downward deflection angle of about 10°-15° relative to the direction of movement of the vehicle.

11. The assembly of claim 1 or claim 6, wherein the lateral deflectors are positioned to deflect the airstream at angles of about 4°-15° relative to the direction of movement of the vehicle.

12. The assembly of claim 7, wherein the surface areas of the outboard lateral deflectors are substantially greater than the surface areas of the inboard lateral deflectors.

13. In combination with a tractor drawn semi-trailer of the type having the rear of the trailer supported by tandem axle dual wheel assemblies with the forward portion thereof supported by the tractor, an airstream deflector assembly depending from the undercarriage of the trailer well forward of the following tires of the trailer, said airstream deflector assembly comprising an essentially flat panel substantially spanning the underside of the trailer and arranged to deflect the airstream passing beneath the trailer downwardly at a shallow angle so that it passes primarily into the area generally below the following axle and centers of the following tires, such deflector assembly also including lateral airstream deflectors situated near the ends of said panel and deflecting the airstream primarily inwardly toward the following tires of the wheel assemblies, such airstream deflections resulting in the deflected airstream passing primarily below the axle(s) of the following wheel assemblies and into engagement with the receding surfaces of the following tires so that a relatively high velocity blanket of air is formed adjacent to the roadway with substantially reduced airstream contact with non-receding surfaces of the trailer including the following axles and forwardly moving upper portions of the following tires, such blanket of air thereby tending to suppress kickups of water, mud or snow from the roadway and also to keep the rear end of the trailer clear of accumulated water, mud or snow.

14. The combination of claim 13, wherein the surface of said panel is positioned about midway between the rear tires of the tractor and the following tires of the trailer and at a downward angle of about 10°-15° relative to the direction of movement of the trailer.

* * * * *